Sept. 11, 1962   P. J. McGAULEY   3,053,651
TREATMENT OF SULFIDE MINERALS
Filed Jan. 21, 1958
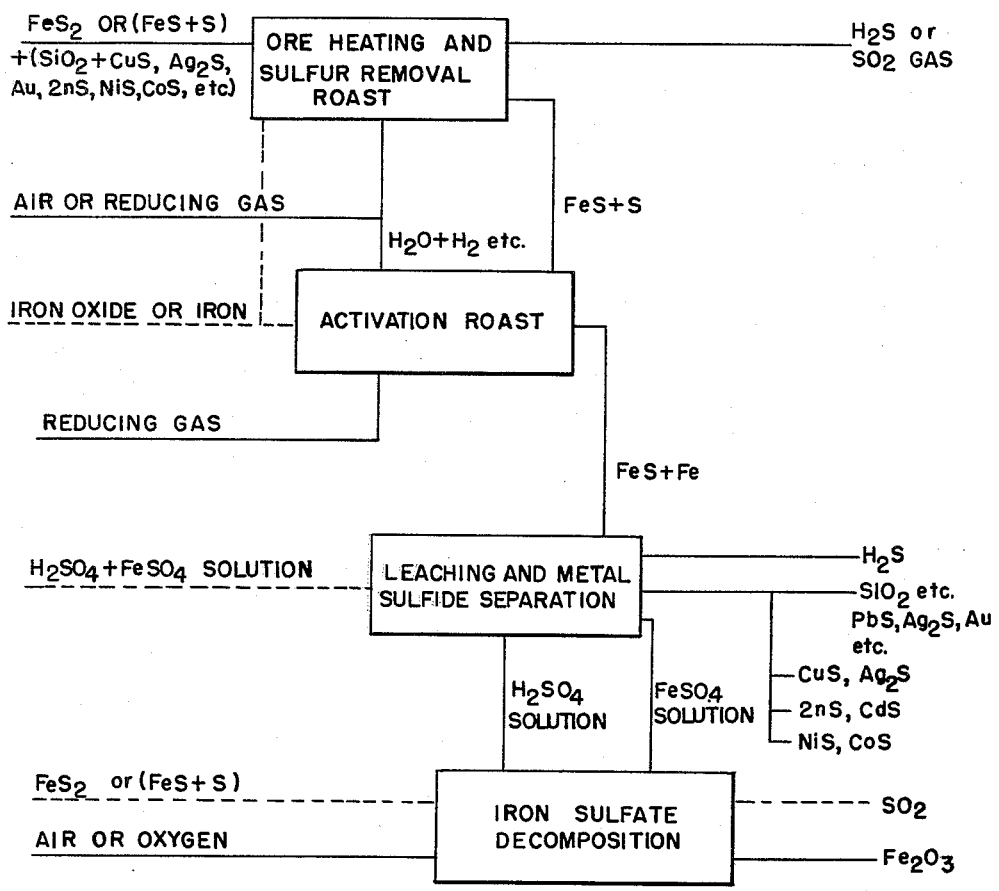
INVENTOR.
PATRICK J. McGAULEY
ATTORNEYS

United States Patent Office 3,053,651
Patented Sept. 11, 1962

3,053,651
TREATMENT OF SULFIDE MINERALS
Patrick J. McGauley, Port Washington, N.Y., assignor to Chemetals Corporation, New York, N.Y., a corporation of Delaware
Filed Jan. 21, 1958, Ser. No. 710,255
13 Claims. (Cl. 75—116)

This invention relates to the treatment of sulfide mineral mixtures containing iron and non-ferrous metal values. The principal object of the invention is to provide a method for economically separating the iron, sulfur, and non-ferrous metal values into commercially desirable products.

Valuable ores containing sulfur, iron, and non-ferrous metals exist in substantial quantities throughout the world. In the past these ores have been subjected to concentration and to various other processes to recover such non-ferrous metal values as copper, nickel, cobalt, lead, zinc, cadmium, and so forth. The concentrates have also been treated to recover the contained iron and sulfur. In each case, however, the processes used in the past have had the disadvantage of prohibiting the economic recovery of all of the components present. The use of such prior processes has been limited to certain ores and concentrates having a sufficiently high concentration of the desired component to make the removal of that component alone economically feasible.

Various sulfide mineral mixtures can be processed by the process of this invention to recover the contained sulfur, iron, and non-ferrous metal values. The sulfide mineral mixtures which can be treated include raw sulfide ores as well as partially processed sulfide ores such as calcines and concentrates. In practice, the sulfide mineral mixtures processed according to this invention will be those most readily available and will include such raw ores as pyrrhotite and mixtures of pyrrhotite with pyrites, as well as non-ferrous metal concentrates such as copper and nickel concentrates.

The heating of the sulfide mineral mixtures to remove the labile sulfur and also to activate the sulfide mineral mixtures is carried out below the melting or fusion point of the mixture. The particular temperature used will depend mainly upon the type of sulfide mineral mixture being processed. For example, the maximum temperature to which pyrrhotite containing little copper could be heated would be about 1073° C., while the maximum temperature to which a sulfide mineral mixture containing larger amounts of copper, such as a copper concentrate, could be heated would be approximately 900° C.

This invention provides a process for treating sulfide mineral mixtures to recover in commercially desirable forms the contained iron, sulfur, and non-ferrous metal values. This invention also provides a process which can be varied advantageously to recover the sulfur, iron, and other components therefrom in a form which can readily be disposed of over a wide economic radius.

The term "mol ratio of sulfur to iron" as used herein means the ratio of the sulfur associated with iron and does not include the sulfur present in sulfide minerals combined with any of the non-ferrous metals. The mol ratio of sulfur to iron, as can be observed throughout the specification and particularly in the examples, is the same as the atomic weight ratio between the elements. Stated still another way, the mol ratio of sulfur to iron is equal to the weight ratio of 32.066 pounds of sulfur to 55.85 pounds of iron.

The term "activated calcine" is used herein to describe the product produced by adding metallic iron to a sulfide mineral and heating the resulting mixture containing the metallic iron to a temperature below the melting point of ferrous sulfide for a period of time sufficient to produce a calcine which has a mol ratio of sulfur to iron of less than unity and which is capable of being completely dissolved in dilute (about 10%) sulfuric acid with the production of hydrogen sulfide gas.

The term "labile sulfur" is used herein to describe that sulfur which can be expelled from sulfide mineral mixtures by heating the sulfide mineral mixtures to a temperature below their melting points in the absence of an oxidizing agent.

In effecting the transformation of a sulfide mineral from a sulfide mineral mixture containing a mol ratio of sulfur to iron in excess of unity to an activated calcine containing a mol ratio of sulfur to iron of less than unity it is necessary to add metallic iron to the sulfide mineral mixture. These compositions containing metallic iron, or a hydrogen reducible iron compound, are still considered to be sulfide mineral mixtures having a mol ratio of sulfur to iron in excess of unity since the metallic iron or hydrogen reducible iron compound present is not associated with the iron sulfide compounds present. The metallic iron present only becomes associated with the iron sulfide compounds upon activation of the sulfide mineral mixture as herein described.

The general operating steps of this invention are shown in the accompanying drawing which is a simplified flow sheet showing the principal steps and variations thereof which can be used according to this invention and which are described in more detail below.

According to this invention sulfide mineral mixtures are first heated to a temperature below the melting point of ferrous sulfide to drive off the labile sulfur. The sulfide compounds remaining after the labile sulfur has been removed may be classified in two groups: (a) the non-ferrous metal sulfides, and (b) the iron sulfide compounds. The sulfide compounds in group (a) are those which correspond to the lowest valence state of the metal involved. Thus copper sulfide would be present as $Cu_2S$ rather than as CuS. The iron sulfide compound which is stable at these temperatures, however, is not FeS, but is FeS plus excess sulfur. This excess sulfur is believed to be present in the form of a solid solution of sulfur (or of $FeS_2$) in the compound FeS. If only the iron sulfide compounds are considered, the residual calcine from which the labile sulfur has been removed will still contain a molecular ratio of sulfur to iron of up to about 1.15. This molecular ratio corresponds to the analysis of many pyrrhotite minerals in their natural state. Most natural pyrrhotite minerals, in common with the artificial sulfide mixtures resulting from the removal of the labile sulfur from pyritic sulfide minerals are only very slightly soluble in dilute acids.

The non-ferrous sulfide compounds which are stable at temperatures above the melting point of ferrous sulfide generally contain sulfur at ratios approximately stoichiometric to the lowest valence of the metal involved. It is therefore apparent that when a sulfide mineral mixture is heated to a temperature below the melting point of ferrous sulfide, sulfur will be expelled from both the ferrous and non-ferrous metal sulfides in the mixture.

I have observed that the heating of sulfide mineral mixtures to a temperature below the melting point of ferrous sulfide generally results in the production of a sulfide calcine which, when the effect of the known non-ferrous metal sulfides is subtracted, has a mol ratio of sulfur to iron of as low as 1.03. Although it may be possible to continue to expel sulfur at a temperature below the melting point of FeS until the ratio of 1.00 is achieved, this result cannot be achieved in any practical manner unless an oxidizing agent is also present.

The actual heating of the sulfide mineral mixtures to effect the removal of the labile sulfur can be carried out in the presence of neutral gases, reducing gases, or oxidizing gases and at reduced, atmospheric, or elevated pressures.

If and when all of the sulfur product is desired in the elemental form at the location of the plant, or when waste acid solutions or other extraneous sources of sulfur are available to the process, it will often be desirable to employ reducing gases containing hydrogen in the removal of the labile sulfur according to this invention. When such reducing gases are employed, the labile sulfur in the feed is removed as hydrogen sulfide gas.

The labile sulfur can also be advantageously removed from the sulfide mineral mixtures by heating the sulfide mineral mixtures to a temperature below the melting point of ferrous sulfide in the presence of a gas containing oxygen. When such an oxidizing gas is employed, the labile sulfur in the feed is removed as sulfur dioxide gas, and it can be used in those cases where at least part of the sulfur product is desired in the form of sulfuric acid at the location of the plant employing this invention. The use of an oxidizing gas to remove the labile sulfur has the additional advantage that the exothermic heat of reaction can be employed to heat the sulfide feed, often to the desired operating temperature, without the use of any extraneous fuel.

When using an oxidizing gas to remove the labile sulfur from a sulfide mineral mixture, careful control must be exercised to avoid also oxidizing the desired product to an undesirable extent. Since it is not difficult to maintain the necessary degree of control, oxidation will often be the preferred method of removing the labile sulfur.

The removal of the labile sulfur from the sulfide mineral mixtures according to this invention not only results in the economic removal of this sulfur in commercially desirable and variable forms, but in addition, permits the economic addition of metallic iron to the sulfide mineral mixtures for subsequent activation to an activated calcine soluble in dilute sulfuric acid and having a mol ratio of sulfur to iron of less than unity.

It is not absolutely necessary to remove all of the labile sulfur in the labile sulfur removal step, but it is advantageous to remove substantially all of the labile sulfur. The presence of labile sulfur increases the amount of metallic iron necessary for subsequent activation to a product having a mol ratio of sulfur to iron of less than unity since the metallic iron will readily combine with the labile sulfur present.

In addition, it is not essential to stop the removal of sulfur by oxidation when an oxidizing gas is being employed at a point where all of the labile sulfur has been removed so that the resulting product will not contain any metal oxides. In fact, the continued oxidation of the sulfide mineral mixture to effect a partial oxidation of a small part of the ferrous sulfide present to a hydrogen reducible iron oxide is highly advantageous as is hereinafter discussed in more detail. It is highly desirable, however, to prevent the oxidation of the ferrous sulfide beyond about 2% of the total iron in the original feed. Over oxidation of the ferrous sulfide results not only in excess dilution with nitrogen of the sulfur dioxide gas being evolved, but also in the consumption of excess hydrogen to convert the resulting iron oxide to metal or to the lower valent oxides of iron. Since the amount of metallic iron necessary for the subsequent activation treatment is relatively small, any oxidation of the iron sulfide beyond that required for the activation step has the additional quantities of hydrogen and results in the production of less $H_2S$ gas during the further processing according to this invention.

If a sulfide mineral mixture, such as many natural pyrrhotites, containing only a relatively small amount of labile sulfur is being processed according to this invention, it would not be necessary or even desirable to treat the sulfide mineral mixture for removal of the small amount of labile sulfur present. In such a case, the metallic iron or the hydrogen reducible iron compound required in the subsequent activation operation to bring the mol ratio of sulfur to iron to below unity can be added directly to the sulfide mineral mixture according to this invention. If the original feed already contains metallic iron or a hydrogen reducible iron compound in sufficient amounts, it, of course, will not be necessary to add the iron to the sulfide mineral mixture and activation can be carried out directly.

The temperature used to remove the labile sulfur as stated above must be below the melting point of ferrous sulfide. I have found that it is advantageous to maintain the temperature between about 600° C. to about 800° C., although temperatures as low as about 450° C. have been found to be effective when the feed was treated over an excessively long period of time.

The next step in the process of this invention involves the treatment of a sulfide mineral to convert the contained iron sulfide into a form that is completely soluble in dilute sulfuric acid with the generation of hydrogen sulfide gas. I have found that such sulfide mineral mixtures which are relatively insoluble in dilute sulfuric acid can be rendered completely soluble therein by mixing particles of metallic iron with the particles of the sulfide mineral and contacting this mixture for a few minutes at a temperature below the melting point of ferrous sulfide.

The reacted or activated calcine has a mol ratio of sulfur to iron of less than unity and is believed to be a solid solution of iron in the compound FeS. The particles of metallic iron apparently either extract sulfur from the ferrous sulfide or pyrrhotite or iron is absorbed into the pyrrhotite or FeS in a manner such that the distribution of sulfur becomes uniform throughout the resulting product. The resulting activated calcine is characterized by the ability of its contained iron to dissolve completely in dilute (10%) sulfuric acid with the production of hydrogen sulfide gas.

The minimum quantity of metallic iron which must be added to the sulfide mineral is theoretically equal to the molecular excess of sulfur to iron which is associated with the iron in the sulfide mineral. The addition of the minimum theoretical quantity of iron results in an iron product, at equilibrium, which would be the compound FeS. Since the object of this invention is the complete dissolution of the iron from the mineral feed, an excess of iron equal to about 2 mol percent of the total iron in the feed has been found to be advantageous. A sulfide mineral calcine containing about 98 percent of its iron as FeS and about 2 percent of its iron as metal is theoretically the most advantageous activated calcine for subsequent use.

The metallic iron can be added to the sulfide mineral in various forms and in various stages of the process of this invention. The addition of metallic iron or sponge iron will probably be rarely used in the practice of this invention. Instead, iron oxide or other hydrogen reducible iron compounds will be added and subsequently reduced during the activation step.

The metallic iron or iron oxide can be added to the original sulfide feed provided this point of addition is economically desirable. It is advantageous to add the metallic iron or reducible iron compound to the original sulfide mineral feed when the ratio of sulfur to iron is sufficiently low that the removal of the labile sulfur is not economical. In addition, where the amount of labile sulfur present is low, it is not necessary to add large quantities of iron or iron oxide. The metallic iron or iron oxide can also be added to the sulfide mineral after the labile sulfur has been removed. This procedure is best followed where the labile sulfur present is in large quantities and where it would be economically desirable to remove it prior to the addition of the iron and subsequent activation.

In any case, from about 3 to 10 percent, and usually about 5% of the total units of iron in the activated product will be generated from iron oxide with a reducing gas or will be added as metal during, or just prior to the activation step.

The next principal step in the process of this invention involves the leaching of the iron from the activated calcine. This leaching operation broadly involves the mixing of the activated calcine with a dilute solution of sulfuric acid causing the evolution of hydrogen sulfide gas. The products resulting from the chemical decomposition of the leaching operation are then separated and collected for further processing. The leaching of the activated calcine can be carried out in various manners according to this invention, and I have found that it is advantageous to employ an excess of activated calcine, or a deficiency of sulfuric acid, in the leaching operation.

When excess activated calcine is employed in the leach a neutral solution of ferrous sulfate is obtained. Since the activated calcine is used in excess, an amount of ferrous sulfide will remain in the residue together with the insoluble non-ferrous metal sulfides. The amount of ferrous sulfide remaining in the residue will depend upon the amount of excess activated calcine employed in the leach and can easily be controlled. Since one of the objects of this invention is to separate the iron from the non-ferrous metals, only a small amount of excess activated calcine will generally be employed in the leach.

When excess activated calcine is employed in the leach the resulting residue will contain the sulfides of copper, lead, gold, silver, nickel, cobalt, zinc, silica, and the like, provided that these metals are present in the sulfide feed being processed.

The ferrous sulfide and all of the zinc can be removed from the leach residue by leaching the residue a second time with excess amount of the dilute sulfuric acid. The zinc sulfide present in the residue will react with the dilute sulfuric acid to form zinc sulfate and hydrogen sulfide gas. The resulting leach solution will be a concentrated acidic solution of zinc sulfate. This acidic solution of zinc sulfate can then again be neutralized with an activated calcine containing only zinc and iron sulfides. The chemical reaction involved may be represented by the following reaction equation:

$$ZnSO_4 + ZnS + FeSO_4$$

The residue remaining after the zinc has been removed as zinc sulfate will still contain the remaining non-ferrous metals. The copper, silver, nickel, and cobalt can be removed from the remaining residue as sulfates by several different methods. One advantageous method is to oxidize the copper, silver, nickel, and cobalt sulfides to the respective sulfates with air in a pressurized slurry with dilute sulfuric acid.

The copper and silver can be separated from the nickel and cobalt by precipitation of their sulfides in an acid solution with either hydrogen sulfide gas or ferrous sulfide as the source of sulfur. The nickel and cobalt can also be precipitated as sulfides with ferrous sulfide from a neutral solution. The waste liquors from each of the above separating steps can be recycled to the activated calcine leaching system where the added iron can be recovered.

It will be noted from the above description that the non-ferrous metals in the feed can be easily separated into at least four separate, and highly concentrated products, each obtained without importation into the system of extraneous chemicals or other precipitants. The four products so obtained are each at least equal to, if not better than, the usual high-grade feed from which the contained metals are generally recovered by conventional metallurgy. The four solid non-ferrous metal intermediate products will be listed as follows:

(1) Lead concentrate containing gold and the other precious metals in the feed;
(2) High-grade precipitate of copper sulfide containing the silver, tin, mercury, antimony, etc., when present in the original feed to the process;
(3) High-grade chemical precipitate of zinc sulfide containing very little iron but most of the cadmium when present in the feed to the process; and
(4) High-grade chemical precipitates of nickel and cobalt, essentially free of copper and precious metals.

The two additional products from the leaching and separation system are:
(1) A neutral clarified aqueous solution of ferrous sulfate containing manganese and other soluble sulfates of similar metals when contained in the feed; and
(2) A high-grade gas containing principally $H_2S$ and water vapor but also containing selenium and possibly some arsenic when contained in the feed.

The selenium may be separated and recovered from the above gas by preliminary treatment with $SO_2$. The sulfur may be recovered in the elemental form by conventional treatment with $SO_2$ gas, which is also produced in the process of this invention.

The neutral solution of ferrous sulfate can be further processed according to this invention in various manners.

One manner of treating the neutral solution of ferrous sulfate according to this invention involves the conversion of the neutral solution of ferrous sulfate resulting from the activated calcine leach into a solution of sulfuric acid which can be recycled to the leaching operation and employed to dissolve more iron from the activated calcine. The regeneration of the acid is accomplished by oxidation of the neutral ferrous sulfate to ferric sulfate and ferric oxide, followed by hydrolysis of the ferric sulfate to more ferric oxide and more acid at elevated temperatures according to the following reactions:

$$12FeSO_4 + 3O_2 = 4Fe_2(SO_4)_3 + 2Fe_2O_3 \cdot xH_2O$$
$$Fe_2(SO_4)_3 + (3+x)H_2O = 3H_2SO_4 + Fe_2O_3 \cdot xH_2O$$

When the above reactions are carried out at a temperature of about 450° F. in the presence of a small amount of $CuSO_4$ as a catalyst for the oxidation of iron, the reaction will proceed to a degree that will yield a solution containing 10 percent $H_2SO_4$ in less than one-half hour of reaction time. The iron oxide solid must be removed from the acid as soon as possible after the solution is cooled to its boiling temperature to avoid the following reverse reaction which will consume acid:

$$Fe_2O_3 \cdot xH_2O + H_2SO_4 = Fe_2(OH)_4SO_4$$

The rate of the above reaction is relatively slow however and the iron oxide may be removed from the solution with conventional equipment at a reasonably low sulfur analysis. This hydrated iron oxide can then be mixed with coal or coke and sintered to produce high-grade feed for iron blast furnaces.

Another manner of treating the neutral ferrous sulfate solutions produced according to this invention involves evaporation of the water from the neutral ferrous sulfate solution and the decomposition of the crystals of ferrous sulfate with pyrites. The pyrites are employed as a fuel and reducing agent.

The actual quantity of pyrites required depends on the equipment employed, but the minimum theoretical quantity which will make the reaction exothermic with air is about 32 mols of iron in pyrites to 100 mols of iron in $FeSO_4 \cdot H_2O$ crystals. The chemical reactions involved in this operation are believed to be about as follows:

$$50FeSO_4 \cdot H_2O + 16FeS_2 + 31O_2$$
$$= 33Fe_2O_3 + 82SO_2 + 50H_2O$$

Pyrite or pyrrhotite are the only fuels which, when employed in this operation, add both sulfur dioxide to the gaseous sulfur product and iron oxide to the solid iron product. All other fuels will add both $CO_2$ and nitrogen to dilute the sulfur content of the gas and impurities to contaminate the iron content of the iron oxide. Since the diluents and impurities in conventional carbonaceous fuels will make both products of this operation less valuable, if not useless for further processing, this novel use of mineral sulfides as a fuel and reducing agent, is an important part of this invention.

Of the two alternates for treating the neutral ferrous sulfate solution as set forth above the particular alternate selected for any plant installation will depend on the feed available to, and the products desired from that installation. When the process of this invention is employed at plants which produce non-ferrous metal sulfides such as nickel, copper, lead and zinc as the primary products, then the first alternate will generally be desirable. If and when this process is operated in conjunction with other plants producing more refined products titanium dioxide and normally generating waste acid and/or sulfate salts containing iron, such as pickle liquors, then the second alternate will generally be desirable.

The following examples illustrate various methods of treating sulfide mineral mixtures for the separation of iron, sulfur, and other non-ferrous metal values according to this invention.

*Example I*

A sulfide mineral mixture having a mol ratio of sulfur to iron in excess of unity and the following approximate analysis was processed for the separation of iron, sulfur, and copper according to this invention.

| Component | Weight percent | Content | |
|---|---|---|---|
| | | Lbs. | Lb.-mols |
| Copper | 31.3 | 626 | 9.87 |
| Iron | 21.7 | 434 | 7.77 |
| Sulfur | 28.2 | 564 | 17.26 |
| Acid insolubles | 18.8 | 376 | |
| Total raw concentrate | 100.0 | 2,000 | 34.90 |

The above sulfide mineral mixture was oxidized with air in a roasting furnace at a temperature of between 700° C. to 900° C. until about 30% of the sulfur was removed as sulfur dioxide gas. The oxidation of the sulfide mineral mixture resulted in the removal of about 30% of the sulfur, produced a sulfide product containing only those sulfide compounds of iron and the non-ferrous metals which are stable at temperatures below the melting point of ferrous sulfide and, in addition, resulted in the production of a sufficient amount of a hydrogen reducible iron compound ($Fe_2O_3$) to produce a sulfide mineral activated calcine having a mol ratio of sulfur to iron of less than unity when treated according to this invention. The amount of iron present as $Fe_2O_3$ was equivalent to about 6.5% of the total iron present in the mixture.

The approximate analysis of the sulfide mineral product resulting from the oxidation and removal of about 30% of the sulfur was found to be as follows:

| Component | Weight percent | Content | |
|---|---|---|---|
| | | Lbs. | Lb.-mols |
| Copper | 34.0 | 626 | 9.87 |
| Iron | 23.6 | 434 | 7.77 |
| Sulfur | 21.3 | 392 | 12.21 |
| Oxygen | 0.7 | 12 | 0.38 |
| Insolubles | 20.4 | 376 | 0.00 |
| Total | 100.0 | 1,840 | 30.23 |

The compounds in this sulfide mineral calcine were calculated to be approximately as follows:

$Cu_2S$ _____ 100% of the Cu.
$FeS$ _____ 93.5% of the Fe.
$Fe_2O_3$ _____ 6.5% of the Fe.

The above sulfide mineral mixture was then contacted in a suitable furnace while it was still hot at a temperature of about 700° C. with a gas containing hydrogen while being thoroughly agitated. In this particular instance a generator gas containing about 50% hydrogen was used. The sulfide mineral calcine was agitated in contact with hydrogen at 700° C. for about 10 to 15 minutes. The $Fe_2O_3$ present in the sulfide mineral calcine was reduced to metallic iron during the contacting of the sulfide mineral mixture with hydrogen, and the mixture changed color from red to black and became very reactive to decomposition in sulfuric acid.

The approximate analysis of the resulting activated calcine was found to be as follows:

| Component | Weight percent | Content | | Assumed compounds |
|---|---|---|---|---|
| | | Lbs. | Lb.-mols | |
| Copper | 34.3 | 626 | 9.87 | $Cu_2S$, 100%. |
| Iron | 23.7 | 434 | 7.77 | FeS+Fe, 100%. |
| Sulfur | 21.4 | 392 | 12.21 | |
| Insolubles | 20.6 | 376 | | Insolubles. |
| Total | 100.0 | 1,828 | 29.85 | |

The resulting activated calcine was then leached in an excess quantity of 10% sulfuric acid solution resulting in the production of 240 pounds of concentrated hydrogen sulfide gas. The hydrogen sulfide gas was collected and the resulting leach solution separated from the insolubles by filtration.

The residue separated from the solution was dried and an approximate analysis of the residue was found to be as follows:

| Component | Weight percent | Content | | Assumed compounds |
|---|---|---|---|---|
| | | Lbs. | Lb.-mols | |
| Copper | 53.6 | 626 | 9.87 | $Cu_2S$. |
| Iron | 0.5 | 6 | 0.10 | $FeS_2$. |
| Sulfur | 13.8 | 162 | 5.05 | |
| Insolubles | 32.1 | 376 | | |
| Total | 100.0 | 1,170 | 15.02 | |

The leach solution after being separated from the insoluble residue was then neutralized with excess activated calcine to produce a neutral ferrous sulfate leach liquor having the following approximate analysis:

| Component | Weight percent | Content | |
|---|---|---|---|
| | | Lbs. | Lb.-mols |
| $FeSO_4$ | 23.1 | 462 | 3.00 |
| $H_2O$ etc. | 76.9 | 1,538 | 85.44 |
| Total | 100.0 | 2,000 | 88.44 |

The neutral ferrous sulfate leach liquor was then processed for the recovery of dilute sulfuric acid and iron oxide as follows:

About 2000 pounds of the neutral ferrous sulfate leach liquor was transferred to an autoclave, heated to about 450° F. and contacted with oxygen gas at a total pressure of about 650 p.s.i.g. for about 30 minutes. The resulting slurry was then rapidly cooled to a temperature of about 180° F. and the liquid separated from the solid at a temperature of about 150° F.

An approximate analysis of the liquid was as follows:

| Component | Weight percent | Content | |
|---|---|---|---|
| | | Lbs. | Lb.-mols |
| $FeSO_4$ | 7.7 | 154 | 1.00 |
| $H_2SO_4$ | 14.8 | 294 | 2.00 |
| $H_2O$ | 77.5 | 1,538 | 85.44 |
| Total | 100.0 | 1,936 | 88.44 |

The solid remaining after the separation of the liquid was then dried. An analysis of the dried solid showed that it contained about 98.2% of the iron in the original feed and about 1.6% of the sulfur.

The copper residue collected after the leaching of the activated calcine with dilute sulfuric acid was then further processed to metal by conventional processes. The sulfur in this copper residue was released as $SO_2$ during the processing and the $SO_2$ combined with the $H_2S$ gas formed during the leaching of the activated calcine. The total recovery of sulfur in commercial form was in excess of 89.4% of the sulfur in the original feed.

*Example 2*

Another ton of the copper sulfide concentrate as set forth in Example I was again processed according to the methods of this invention. In this example a dilute acid solution of copper and iron sulfates was available from the leaching of the copper oxide ores, and a pyrite mineral concentrate was available from the discarded tailings of copper sulfide flotation. The sulfur, iron and copper from all three of these products were recovered by the methods of this invention.

The approximate analysis of the copper sulfide concentrate feed was as follows:

| Component | Weight percent | Content | |
|---|---|---|---|
| | | Lbs. | Lb.-mols |
| Copper | 31.3 | 626 | 9.87 |
| Iron | 21.7 | 434 | 7.77 |
| Sulfur | 28.2 | 564 | 17.26 |
| Acid insoluble | 18.8 | 376 | |
| Total | 100.0 | 2,000 | 34.90 |

An approximate analysis of the acid solution from the copper oxide leaching was as follows:

| Component | Weight percent | Content | |
|---|---|---|---|
| | | Lbs. | Lb.-mols |
| $CuSO_4$ | 4.0 | 79.8 | 0.5 |
| $FeSO_4 \cdot H_2O$ | 11.0 | 220.0 | 1.2 |
| $H_2SO_4$ | 4.0 | 79.5 | 0.8 |
| $H_2O$ | 81.0 | 1,620.7 | 90.0 |
| Total | 100.0 | 2,000.0 | 92.5 |

An approximate analysis of the pyrites concentrate from the waste tailings was as follows:

| Component | Weight percent | Content | |
|---|---|---|---|
| | | Lbs. | Lb.-mols |
| $FeS_2$ | 91.0 | 1,820 | 15.2 |
| Acid insolubles | 9.0 | 180 | |
| Total | 100.0 | 2,000 | 15.2 |

The above copper concentrate feed was heated in the presence of a generator gas containing about 50% hydrogen in a roasting furnace at a temperature of about 800° C. until about 24.5% of the total sulfur in the feed was driven off. The total weight of sulfur driven off as hydrogen sulfide gas was about 144 pounds. The heating of the sulfide feed resulted in the removal of about 24.5% of the total sulfur in the feed. The sulfur to iron ratio in the remaining product was in excess of unity, and this product contained only those sulfide compounds of iron and the non-ferrous metals which are stable at temperatures below the melting point of ferrous sulfide.

The approximate analysis of the sulfide mineral mixture resulting from the heating thereof in the presence of hydrogen gas was found to be as follows:

| Component | Weight percent | Content | | Assumed compounds |
|---|---|---|---|---|
| | | Lbs. | Lb.-mols | |
| Copper | 33.8 | 626 | 9.87 | $Cu_2S$. |
| Iron | 23.4 | 434 | 7.77 | $FeS+S$. |
| Sulfur | 22.4 | 416 | 13.00 | |
| Insolubles | 20.4 | 376 | | |
| Total | 100.0 | 1,852 | 30.64 | |

About 80 pounds of $Fe_2O_3$ product were recycled from the iron plant and added to the hot sulfide mineral mixture resulting from the treatment with the hydrogen reducing gas, and the resulting mixture was activated to render the contained iron completely soluble in dilute sulfuric acid, by heating it in a roasting furnace at about 800° C. in the presence of a generator gas containing about 50% hydrogen. During the heating of the sulfide mineral calcine in the presence of the reducing gas containing hydrogen the mixture was continuously agitated by raking. The resulting activated calcine had a mol ratio of sulfur to iron of less than unity, and was completely soluble in dilute (about 10%) sulfuric acid. The weight, content and approximate analysis of the activated calcine from one ton of the copper concentrate feed was as follows:

| Component | Weight percent | Content | | Assumed compounds |
|---|---|---|---|---|
| | | Lbs. | Lb.-mols | |
| Copper | 33.3 | 626 | 9.87 | $Cu_2S$. |
| Iron | 24.6 | 462 | 8.27 | $FeS+Fe$. |
| Sulfur | 22.1 | 416 | 13.00 | |
| Insolubles | 20.0 | 376 | | |
| Total | 100.0 | 1,880 | 31.14 | |

The above activated calcine was then mixed and agitated with about 6.5 tons of the acid solution from the copper oxide leaching. All of the copper in this solution was precipitated as CuS and essentially all of the iron was dissolved from the activated calcine.

About 154 pounds of additional hydrogen sulfide gas was produced during this leaching operation, which was collected and added to the 144 pounds of hydrogen sulfide gas previously collected.

The analysis and content of the copper sulfide leach residue was about as follows:

| Component | Weight percent | Content | | Assumed compounds |
|---|---|---|---|---|
| | | Lbs. | Lb.-mols | |
| Copper | 56.1 | 832 | 13.12 | $Cu_2S+CuS$. |
| Iron | 0.9 | 14 | 0.25 | $FeS_2$. |
| Sulfur | 17.7 | 262 | 8.20 | |
| Insolubles | 25.3 | 376 | | |
| Total | 100.0 | 1,484 | 21.57 | |

The approximate analysis of the resulting iron leach solution was as follows:

| Component | Weight percent | Content | |
|---|---|---|---|
| | | Lbs. | Lb.-mols |
| $CuSO_4$ | 0.0 | Tr. | 0.0 |
| $FeSO_4 \cdot H_2O$ | 19.7 | 2,600 | 15.32 |
| $H_2SO_4$ | 0.7 | 91 | 0.93 |
| $H_2O$ | 79.6 | 10,520 | 585.00 |
| Total | 100.0 | 13,211 | 601.25 |

About 650 pounds of the pyrites concentrate from the waste tailings was then added to this iron leach solution and the water present was evaporated in a spray drier at a temperature of about 80° C. After the water was evaporated the resulting product was a homogeneous mixture of pyrite and $FeSO_4 \cdot H_2O$ crystals having the following approximate analysis:

| Component | Weight percent | Content | |
|---|---|---|---|
| | | Lbs. | Lb.-mols |
| $FeSO_4 \cdot H_2O$ | 77.6 | 2,600 | 15.32 |
| $H_2SO_4$ | 2.7 | 91 | 0.93 |
| $FeS_2$ | 17.8 | 595 | 5.00 |
| Inerts | 1.9 | 59 | |
| Total | 100.0 | 3,345 | 21.25 |

The above mixture was then roasted with about 1250 pounds of air at a temperature of about 800° C. for about one-half hour. The approximate analysis of the iron roaster products was as follows:

| Component | Weight percent | Content | |
|---|---|---|---|
| | | Lbs. | Lb.-mols |
| $Fe_2O_3$ | 96.5 | 1,625 | [1] 20.32 |
| Inerts | 3.5 | 59 | |
| Total solids | 100.0 | 1,684 | [1] 20.32 |
| $SO_2$ | 56.7 | 1,680 | 26.25 |
| $N_2$ | 33.5 | 992 | 35.40 |
| $H_2O$ | 9.8 | 292 | 16.25 |
| Total gas | 100.0 | 2,964 | 77.90 |

[1] Fe.

The resulting iron oxide product contained only about 3.5 weight percent of total impurities, and it will be noted that about 3 times as much iron was recovered as was contained in the original copper concentrate feed. The difference was extracted from the waste solutions and the waste pyrites, both of which are generally discarded at copper recovery plants. The origin of the total iron in the iron roaster product is shown in the following table:

| Feed Component | Quantity (lbs.) | Lbs./ $Fe_2O_3$ | Weight percent | Lb.-mols Fe |
|---|---|---|---|---|
| Copper concentrate | 2,000 | 600 | 35.6 | 7.52 |
| Waste liquor | 13,000 | 628 | 37.3 | 7.80 |
| Waste pyrites | 591 | 397 | 23.6 | 5.00 |
| Diluent in pyrite | 59 | 59 | 3.5 | |
| Total | 15,650 | 1,684 | 100.0 | 20.32 |

The sulfur content of the waste solutions and of the waste pyrites, as well as that of the copper concentrate feed is recovered according to this process. This recovery of valuable by-products from otherwise waste materials is a very important part of this invention. This feature will often enable the installation of iron and sulfur plants at locations where the volume of these by-products contained only in the original feed would not otherwise justify the cost of their recovery. The distribution of sulfur in the feed products from this process is as follows:

| Feed components | Quantity (lbs.) | Lbs. sulfur | Weight percent | Lb.-mols sulfur |
|---|---|---|---|---|
| Copper conc | 2,000 | 564 | 40.2 | 17.26 |
| Waste solution | 13,000 | 520 | 37.1 | 16.28 |
| Waste pyrite | 650 | 320 | 22.7 | 10.00 |
| Total | 15,650 | 1,404 | 100.0 | 43.54 |

| Product compounds | Quantity (lbs.) | Lbs. sulfur | Weight percent | Lb.-mols sulfur |
|---|---|---|---|---|
| $H_2S$ from first roast | 182 | 136 | 9.8 | 4.26 |
| $H_2S$ from leach | 163 | 154 | 11.0 | 4.80 |
| $SO_2$ from second roast | 2,964 | 840 | 60.3 | 26.25 |
| Sulfur in Cu residue | 1,484 | 263 | 18.9 | 8.20 |
| Total | 4,793 | 1,393 | 100.0 | 43.51 |

The sulfur and copper in the copper sulfide leach residue can be recovered as sulfuric acid and refined metal respectively by conventional methods. The 81.1% of the sulfur which is removed by the process of this invention is obtained in two gases containing respectively, about 90 volume percent hydrogen sulfide, and about 42.5 volume percent sulfur dioxide, each on a dry basis. Both or either of these gases can be further processed economically to either elemental sulfur or sulfuric acid by known conventional processes.

*Example 3*

A sulfide mineral mixture having a mol ratio of sulfur to iron in excess of unity and the following approximate analysis was processed for the separation of iron, sulfur, and the non-ferrous metals by the methods of this invention.

| Component | Weight percent | Content | |
|---|---|---|---|
| | | Lbs. | Lb.-mols |
| Nickel | 4.6 | 92 | 1.570 |
| Copper | 5.3 | 106 | 1.670 |
| Cobalt | 0.2 | 4 | 0.068 |
| Iron | 46.8 | 936 | 16.780 |
| Sulfur | 33.7 | 674 | 21.000 |
| Insolubles | 9.4 | 188 | |
| Total | 100.0 | 2,000 | 41.088 |

The above sulfide mineral mixture was mixed with about 100 pounds of $Fe_2O_3$ and the mixture charged to a roaster. The mixture was heated in the roaster to about 750° C. with neutral hot gases from the burning of fuel oil.

The resulting product gas contained very little sulfur and was discarded to the atmosphere. The hot sulfide calcine product was fed to a second roaster countercurrent to a flow of generator gas containing about 50% hydrogen at about 800° C. to reduce the added iron oxide to metallic iron. During the raking of the hot sulfide mineral in the presence of reducing gas and the $Fe_2O_3$, the iron oxide was reduced to metallic iron, and the sulfide mineral mixture was transformed into an activated calcine having a mol ratio of sulfur to iron of less than unity and having the property of being completely soluble in dilute (about 10%) sulfuric acid.

The resulting activated calcine, after removal from the second roaster, had the following approximate composition:

| Component | Weight percent | Content | | Assumed compounds |
|---|---|---|---|---|
| | | Lbs. | Lb.-mols | |
| Nickel | 4.52 | 92 | 1.570 | NiS. |
| Copper | 5.22 | 106 | 1.670 | $Cu_2S$. |
| Cobalt | 0.20 | 4 | 0.068 | CoS. |
| Iron | 49.10 | 1,000 | 17.800 | FeS+Fe. |
| Sulfur | 31.70 | 640 | 20.030 | |
| Insolubles | 9.26 | 188 | | $SiO_2$ etc. |
| Total | 100.00 | 2,030 | 41.138 | |

The above activated calcine was then leached in a recycle solution of dilute (about 10%) sulfuric acid employing excess calcine. The leaching of the activated calcine resulted in the production of about 575 pounds of concentrated hydrogen sulfide gas and a neutral solution of $FeSO_4$. The hydrogen sulfide gas was collected for further processing to elemental sulfur.

The composition of the leach residue was approximately as follows:

| Component | Weight percent | Content Lbs. | Content Lb.-mols | Assumed compounds |
|---|---|---|---|---|
| Nickel | 17.85 | 92 | 1.570 | NiS. |
| Copper | 20.60 | 106 | 1.670 | Cu$_2$S. |
| Cobalt | 0.78 | 4 | 0.068 | CoS. |
| Iron | 5.64 | 29 | 0.520 | FeS. |
| Sulfur | 18.65 | 96 | 3.000 | |
| Insolubles | 36.48 | 188 | | |
| Total | 100.00 | 515 | 6.828 | |

The above residue was then oxidation leached with sulfuric acid and air in a pressure vessel at 350° F. and 500 p.s.i.g. to produce an acid solution of metallic sulfates. The approximate composition of the acid solution of metallic sulfates was as follows:

| Component | Weight percent | Content Lbs. | Content Lb.-mols |
|---|---|---|---|
| NiSO$_4$ | 6.12 | 243 | 1.570 |
| CuSO$_4$ | 6.70 | 266 | 1.670 |
| CoSO$_4$ | 0.25 | 10 | 0.068 |
| FeSO$_4$ | 0.85 | 34 | 0.520 |
| H$_2$SO$_4$ | 4.18 | 166 | 1.700 |
| H$_2$O | 77.16 | 3,000 | 170.000 |
| Insolubles | 4.74 | 188 | |
| Total | 100.00 | 3,967 | 175.528 |

The above slurry was then agitated with hydrogen sulfide gas until all of the copper was precipitated as CuS. The resulting precipitate was then removed from the solution and sent to a copper smelter for recovery of the copper and precious metals content. The approximate composition of this residue was as follows:

| Component | Weight percent | Content Lbs. | Content Lb.-mols |
|---|---|---|---|
| CuS | 46.0 | 160 | 1.670 |
| Insolubles | 54.0 | 188 | |
| Total | 100.0 | 348 | 1.670 |

The filtrate from the CuS precipitation was then neutralized with activated calcine. The residue was removed by filtration and recycled to the leach residue resulting from the leaching of the activated calcine in dilute sulfuric acid.

The resulting clarified filtrate had a composition approximately as follows:

| Component | Weight percent | Content Lbs. | Content Lb.-mols |
|---|---|---|---|
| NiSO$_4$ | 5.70 | 243 | 1.570 |
| CoSO$_4$ | 0.23 | 10 | 0.068 |
| FeSO$_4$ | 13.82 | 590 | 3.890 |
| H$_2$O | 80.25 | 3,420 | 190.000 |
| Total | 100.00 | 4,263 | 195.528 |

The nickel and cobalt in the above neutral solution were then precipitated with H$_2$S gas under pressure. The precipitate was removed by filtration and the liquor cycled to the iron leaching and precipitation system for iron removal. The composition of the nickel precipitate was approximately as follows:

| Component | Weight percent | Content Lbs. | Content Lb.-mols |
|---|---|---|---|
| Nickel | 62.0 | 88 | 1.500 |
| Cobalt | 2.8 | 4 | 0.065 |
| Sulfur | 35.2 | 50 | 1.570 |
| Total | 100.0 | 142 | 3.135 |

The copper and nickel can be easily recovered from the above nickel precipitate by conventional processes.

The iron sulfate resulting from leaching the activated calcine with dilute sulfuric acid and from treatment of the filtrate from the CuS precipitation with activated calcine, was decomposed into dilute sulfuric acid and ferric oxide by the process described in Example I, and the regenerated acid was returned to leach additional activated calcine.

Either elemental sulfur or sulfuric acid can be cheaply manufactured by conventional processes from the collected concentrated hydrogen sulfide gas produced during the process described above.

*Example 4*

A sulfide mineral mixture having a mol ratio of sulfur to iron in excess of unity and the following approximate analysis was processed for the recovery of the non-ferrous metals as sulfides, the iron as an oxide, and the sulfur in elemental form according to the methods of this invention.

| Component | Weight percent | Content Lbs. | Content Lb.-mols |
|---|---|---|---|
| Copper | 0.6 | 12 | 0.19 |
| Lead | 1.2 | 24 | 0.12 |
| Zinc | 4.5 | 90 | 1.38 |
| Iron | 39.5 | 790 | 14.15 |
| Sulfur | 48.0 | 960 | 30.00 |
| Insolubles | 6.2 | 124 | |
| Total | 100.0 | 2,000 | 45.84 |

About one-half of the above sulfide mineral mixture was mixed with about 100 pounds of FeSO$_4$·H$_2$O crystals and roasted with air in a roasting furnace at about 800° C. until about 47% of the total sulfur in the feed was removed as sulfur dioxide gas. The oxidation of the sulfide mineral mixture containing the FeSO$_4$·H$_2$O resulted in the removal of about 47% of the total sulfur, resulted in the production of a sulfide mineral calcine containing only those sulfide compounds of iron and the non-ferrous metals which are stable at temperature below the melting point of ferrous sulfide and, in addition, resulted in the production of sufficient iron oxide in situ to produce an activated calcine having a mol ratio of sulfur to iron of less than unity when treated according to this invention.

The second half of the above sulfide mineral mixture was then roasted at a temperature of about 800° C. in the presence of a generator gas containing about 50% hydrogen. This treatment resulted in the production of hydrogen sulfide gas and a calcine similar to the first one but containing no iron oxide.

The sulfur dioxide and hydrogen sulfide gases were collected for further processing to either elemental sulfur or sulfuric acid.

The sulfide mineral mixtures resulting from each of the above roasts were then mixed together. The mixed product contained sufficient iron oxide to produce an activated calcine having a mol ratio of sulfur to iron of less than unity when treated according to this invention. The approximate analysis of the mixed product was as follows:

| Component | Weight percent | Content | | Assumed compounds |
|---|---|---|---|---|
| | | Lbs. | Lb.-mols | |
| Copper | 0.75 | 12 | 0.19 | $Cu_2S$. |
| Lead | 1.50 | 24 | 0.12 | PbS. |
| Zinc | 5.60 | 90 | 1.38 | ZnS. |
| Iron | 51.50 | 828 | 14.85 | FeS+S. |
| Oxygen | 0.62 | 10 | 0.35 | FeO. |
| Sulfur | 32.30 | 520 | 16.20 | |
| Insolubles | 7.73 | 124 | | |
| Total | 100.00 | 1,608 | 33.09 | |

The above sulfide mineral mixture was then heated to a temperature of about 800° C. in the presence of a reducing gas containing hydrogen to remove the oxygen from the $Fe_2O_3$ and thereby produce metallic iron for activation of the sulfide mineral calcine to produce an activated calcine in which the contained iron was soluble in dilute sulfuric acid.

The activated calcine was then treated with dilute (about 10%) sulfuric acid. In the treatment the activated calcine was employed in sufficient excess so as to completely neutralize the sulfuric acid leach solution. Hydrogen sulfide gas was driven off during this step and collected for further processing. The resulting residue, after the treatment of excess activated calcine with dilute sulfuric acid, had the following approximate composition:

| Component | Weight percent | Content | |
|---|---|---|---|
| | | Lbs. | Lb.-mols |
| Copper | 3.22 | 12 | 0.19 |
| Lead | 6.44 | 24 | 0.12 |
| Zinc | 24.10 | 90 | 1.38 |
| Iron | 12.04 | 45 | 0.80 |
| Sulfur | 20.90 | 78 | 2.45 |
| Insolubles | 33.30 | 124 | |
| Total | 100.00 | 373 | 4.94 |

The above residue was then leached in excess recycled dilute (about 10%) sulfuric acid. The second residue was removed by filtration and was found to have approximately the following composition:

| Component | Weight percent | Content | |
|---|---|---|---|
| | | Lbs. | Lb.-mols |
| Copper | 6.75 | 12 | 0.19 |
| Lead | 13.50 | 24 | 0.12 |
| Iron | 2.81 | 5 | 0.09 |
| Sulfur | 7.30 | 13 | 0.04 |
| Insolubles | 69.64 | 124 | |
| Total | 100.0 | 178 | 0.80 |

The above residue was then sent to a lead smelter for recovery of the lead, copper, and precious metals. The solution resulting from the treatment of the activated calcine with excess sulfuric acid was again neutralized with a slight excess of additional activated calcine. The slurry was filtered, and the precipitate, a high grade concentrate of zinc sulfide, was sent to a zinc smelter for the recovery of elemental zinc. The neutral solution of ferrous sulfate was returned to the activated calcine leach.

The acid used in the activated calcine leach was regenerated from the neutral solution of ferrous sulfate produced according to this process. The dilute sulfuric acid and the iron contained in the neutral ferrous sulfate solution was recovered in the same manner as disclosed in Example I.

The actual products obtained from the sulfide mineral feed were as follows:

| Products | Quantity (lbs.) | Sulfur (lbs.) | Iron (lbs.) |
|---|---|---|---|
| Zinc sulfide | 127 | 39 | 6 |
| Cu-Pb sulfide | 178 | 13 | 5 |
| Iron oxide | 1,120 | | 770 |
| $H_2S$ gas | 690 | 620 | |
| $SO_2$ gas | 1,230 | 250 | |
| Total | 3,345 | 922 | 781 |

The above products represent a recovery of about 97.5% of the iron as high-grade iron oxide, about 90.5% of the sulfur in the form of gases which could be converted to elemental sulfur at high efficiency, and substantially all of the zinc, lead and copper in two sulfide precipitates from which the metal content could be readily and economically extracted by conventional processes.

I claim:

1. The process of treating sulfide minerals containing iron and non-ferrous metals having an atomic ratio of sulfur to iron in excess of unity to recover the contained sulfur, iron, and non-ferrous metals therefrom which comprises causing the sulfide mineral particles to contact one another in the presence of metallic iron which is present in an amount in excess of the excess sulfur associated with the iron present in the sulfide mineral at a temperature below the melting point of the sulfide mineral for a period of time sufficient to produce a sulfide mineral mixture in which the atomic ratio of sulfur to iron is less than unity to render the contained iron sulfide soluble in dilute mineral acid, and leaching the sulfide mineral mixture with a solution containing a mineral acid.

2. In the treatment of raw sulfide mineral mixtures containing iron, the combined heating and leaching procedure which comprises heating the sulfide mineral mixture containing iron to a temperature below the melting point of the mixture, removing, in the gas phase, that sulfur which is displaced from the mineral mixture by said heat treatment, adding to the residual hot solids mixture metallic iron until the proportion of the total iron to sulfur associated with the iron in the mixture exceeds the ratio of 1 atom of iron to 1 atom of sulfur, and agitating the hot mixture at a temperature below the melting point of the mixture until substantially all of the iron content becomes capable of reacting with dilute sulfuric acid to produce soluble iron salts and hydrogen sulfide gas, and leaching the sulfide mineral mixture with a solution containing sulfuric acid.

3. The process of claim 2 in which the raw minerals are initially heated in the presence of non-oxidizing neutral gases, and the excess sulfur is removed in the elementary form.

4. The process of claim 2 in which the raw minerals are initially heated in the presence of reducing gases containing hydrogen, and the excess sulfur is removed as hydrogen sulfide gas.

5. The process of claim 2 in which a hydrogen reducible iron compound is added to the mineral feed and the agitation is carried out in the presence of reducing gases containing hydrogen to produce in situ the metallic iron required to adjust the atomic ratio of iron to sulfur associated with iron in the product to a number greater than unity.

6. The process of claim 2 in which the raw minerals are initially heated in the presence of gases containing oxygen and the excess sulfur is removed as sulfur dioxide gas.

7. The process of claim 5 in which the hydrogen reducible iron compound is produced in situ by heating the raw sulfide mineral mixture in the presence of oxygen-containing gases.

8. The process of claim 5 in which the hydrogen reducible iron compound is iron oxide produced in situ by heating the iron sulfate added to the raw sulfide mineral.

9. In the treatment of raw sulfide mineral mixtures containing iron, the combined heating and leaching procedure which comprises heating the sulfide mineral mixture containing iron to a temperature below the melting point of the mixture, removing, in the gas phase, that sulfur which is displaced from the mineral mixture by said heat treatment, adding to the hot residual solids mixture metallic iron until the proportion of the total iron to sulfur associated with the iron in the mixture exceeds the ratio of 1 atom of iron to 1 atom of sulfur, agitating the hot mixture at a temperature below the melting point of the mixture until substantially all of the iron content becomes capable of reacting with dilute sulfuric acid to produce soluble iron salts and hydrogen sulfide gas, leaching the iron treated product with a dilute solution of a sulfuric acid, collecting the hydrogen sulfide gas resulting from the leaching, and separating the solution of metal salts from the insoluble residue.

10. The process of claim 9 in which the leaching solution contains acid in excess of that required to react with all of the acid soluble metals in the iron treated product.

11. The process of claim 9 in which the leaching solution contains acid deficient to that required to react with all of the acid soluble metals in the iron treated product.

12. The process of claim 10 in which the solution of metal salts is reacted with hydrogen sulfide gas and the sulfide solids are separated from the solution.

13. The process of claim 11 in which the insoluble residue resulting from the leach is reacted with a second solution containing acid in excess of that required to react with all of the acid soluble metals contained in the insoluble residue.

References Cited in the file of this patent

UNITED STATES PATENTS

| 981,451 | McKechnie | Jan. 10, 1911 |
| 1,834,960 | Mitchell | Dec. 8, 1931 |
| 1,892,999 | Ralston et al. | Jan. 3, 1933 |
| 2,424,866 | Udy | July 29, 1947 |
| 2,617,724 | Espenschied | Nov. 11, 1952 |
| 2,746,859 | McGauley et al. | May 22, 1956 |
| 2,759,809 | Aimone et al. | Aug. 21, 1956 |
| 2,778,727 | Schaufelberger | Jan. 22, 1957 |
| 2,871,116 | Clark | Jan. 27, 1959 |

FOREIGN PATENTS

| 112,615 | Great Britain | Sept. 19, 1918 |
| 188,865 | Great Britain | Nov. 23, 1922 |

OTHER REFERENCES

Hachk's Chem. Dictionary, 3rd edition, 1953, page 820, published by The Blakiston Co. Inc., N.Y.

UNITED STATES PATENT OFFICE
CERTIFICATE OF CORRECTION

Patent No. 3,053,651                                September 11, 1962

Patrick J. McGauley

It is hereby certified that error appears in the above numbered patent requiring correction and that the said Letters Patent should read as corrected below.

Column 5, line 44, for the equation, "$ZnSO_4+ZnS+FeSO_4$" read -- $ZnSO_4+FeS=ZnS+FeSO_4$ --; column 11, line 31, for "Te" read -- Fe --.

Signed and sealed this 5th day of February 1963.

(SEAL)
Attest:

ERNEST W. SWIDER
Attesting Officer

DAVID L. LADD
Commissioner of Patents